United States Patent
Omanovic et al.

(10) Patent No.: US 10,254,584 B2
(45) Date of Patent: Apr. 9, 2019

(54) ADAPTABLE BACKLIGHT

(71) Applicant: Panasonic Automotive Systems Company of America, Division of Panasonic Corporation of North America, Peachtree City, GA (US)

(72) Inventors: Edo Omanovic, West Bloomfield, MI (US); Walter Nill, Davison, MI (US); David K. Lambert, Sterling Heights, MI (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 0 days.

(21) Appl. No.: 15/701,664

(22) Filed: Sep. 12, 2017

(65) Prior Publication Data

US 2018/0074373 A1  Mar. 15, 2018

Related U.S. Application Data

(60) Provisional application No. 62/393,299, filed on Sep. 12, 2016.

(51) Int. Cl.
*G09G 3/34* (2006.01)
*G02F 1/1335* (2006.01)

(52) U.S. Cl.
CPC ....... *G02F 1/133603* (2013.01); *G09G 3/342* (2013.01); *G09G 3/3426* (2013.01); *G09G 2320/062* (2013.01); *G09G 2320/064* (2013.01); *G09G 2320/0606* (2013.01); *G09G 2320/0666* (2013.01); *G09G 2380/10* (2013.01)

(58) Field of Classification Search
CPC .......... G02F 1/133603; G09G 2380/10; G09G 3/342

See application file for complete search history.

(56) References Cited

U.S. PATENT DOCUMENTS

| 8,368,823 B2* | 2/2013 | Watanabe | G01C 21/36 348/837 |
| 9,301,369 B2* | 3/2016 | Yaras | G09G 3/342 |
| 2014/0307011 A1* | 10/2014 | Ninan | G09G 3/342 345/691 |
| 2015/0130850 A1* | 5/2015 | Wyatt | G09G 3/342 345/690 |

* cited by examiner

*Primary Examiner* — Seung H Lee
(74) *Attorney, Agent, or Firm* — Laurence S. Roach, Esq.

(57) ABSTRACT

A liquid crystal display arrangement for a motor vehicle includes a plurality of light emitting diodes positioned to backlight a liquid crystal display. A plurality of electrical conductors are each electrically connected to, and provide electrical power to, a different respective subset of the light emitting diodes. An electronic controller is electrically coupled to each of the conductors and individually controls conduction of electricity through each of the conductors to thereby change a brightness of at least one of the subsets of the light emitting diodes relative to a brightness of at least one other subset of the light emitting diodes during operation of the motor vehicle.

17 Claims, 3 Drawing Sheets

ADAPTABLE BACKLIGHT

CROSS-REFERENCED TO RELATED APPLICATIONS

This application claims benefit of U.S. Provisional Application No. 62/393,228 filed on Sep. 12, 2016, which the disclosure of which is hereby incorporated by reference in its entirety for all purposes.

FIELD OF THE INVENTION

The disclosure relates to a liquid crystal display (LCD).

BACKGROUND OF THE INVENTION

In any LCD application, backlights are required in order for the user to see the image. Sometimes, if the backlighting is not uniform, there may be hot spots, or areas where more light is emitted than in other areas. This can cause the image to be discolored and can have an impact on contrast as well. Currently, there is no way to control or change the uniformity of backlighting once the instrument display unit has been built.

SUMMARY

The present invention may provide a way of controlling the optical uniformity of any LCD (Liquid Crystal Display) by controlling the LEDs (Light Emitting Diodes) behind the LCD. By setting up the LEDs in groups or individually, the invention may enable the user to have control over the individual signals that drive the individual LEDs or groups of LEDs, and thus make the had of the display more uniform.

In one embodiment, the invention comprises a liquid crystal display arrangement for a motor vehicle, including a plurality of light emitting diodes positioned to backlight a liquid crystal display. A plurality of electrical conductors are each electrically connected to, and provide electrical power to, a different respective subset of the light emitting diodes. An electronic controller is electrically coupled to each of the conductors and individually controls conduction of electricity through each of the conductors to thereby change a brightness of at least one of the subsets of the light emitting diodes relative to a brightness of at least one other subset of the light emitting diodes during operation of the motor vehicle.

In another embodiment, the invention comprises a method of presenting a display in a motor vehicle, including installing a liquid crystal display in the motor vehicle. A plurality of light emitting diodes are positioned to backlight the liquid crystal display. Each of a plurality of electrical conductors is electrically connected to a different respective subset of the light emitting diodes. Each of the conductors is used to provide electrical power to the different respective subset of the light emitting diodes. Conduction of electricity through each of the conductors is individually controlled to thereby change a brightness of at least one of the subsets of the light emitting diodes relative to a brightness of at least one other subset of the light emitting diodes during operation of the motor vehicle.

In yet another embodiment, the invention comprises a liquid crystal display arrangement for a motor vehicle, including a plurality of light emitting diodes positioned to backlight a liquid crystal display. Each of a plurality of electrical conductors is electrically connected to, and provides electrical power to, a different respective one of the light emitting diodes. An electronic controller is electrically coupled to each of the conductors and controls flow of electrical current through each of the light emitting diodes individually to thereby change a brightness of at least one of the light emitting diodes relative to a brightness of at least one other light emitting diode during operation of the motor vehicle.

An advantage of the present invention is that it enables the uniformity of a display's backlighting to be controlled.

BRIEF DESCRIPTION OF THE DRAWINGS

A better understanding of the present invention will be had upon reference to the following description in conjunction with the accompanying drawings.

DETAILED DESCRIPTION OF THE PREFERRED EMBODIMENTS

Figure 1:
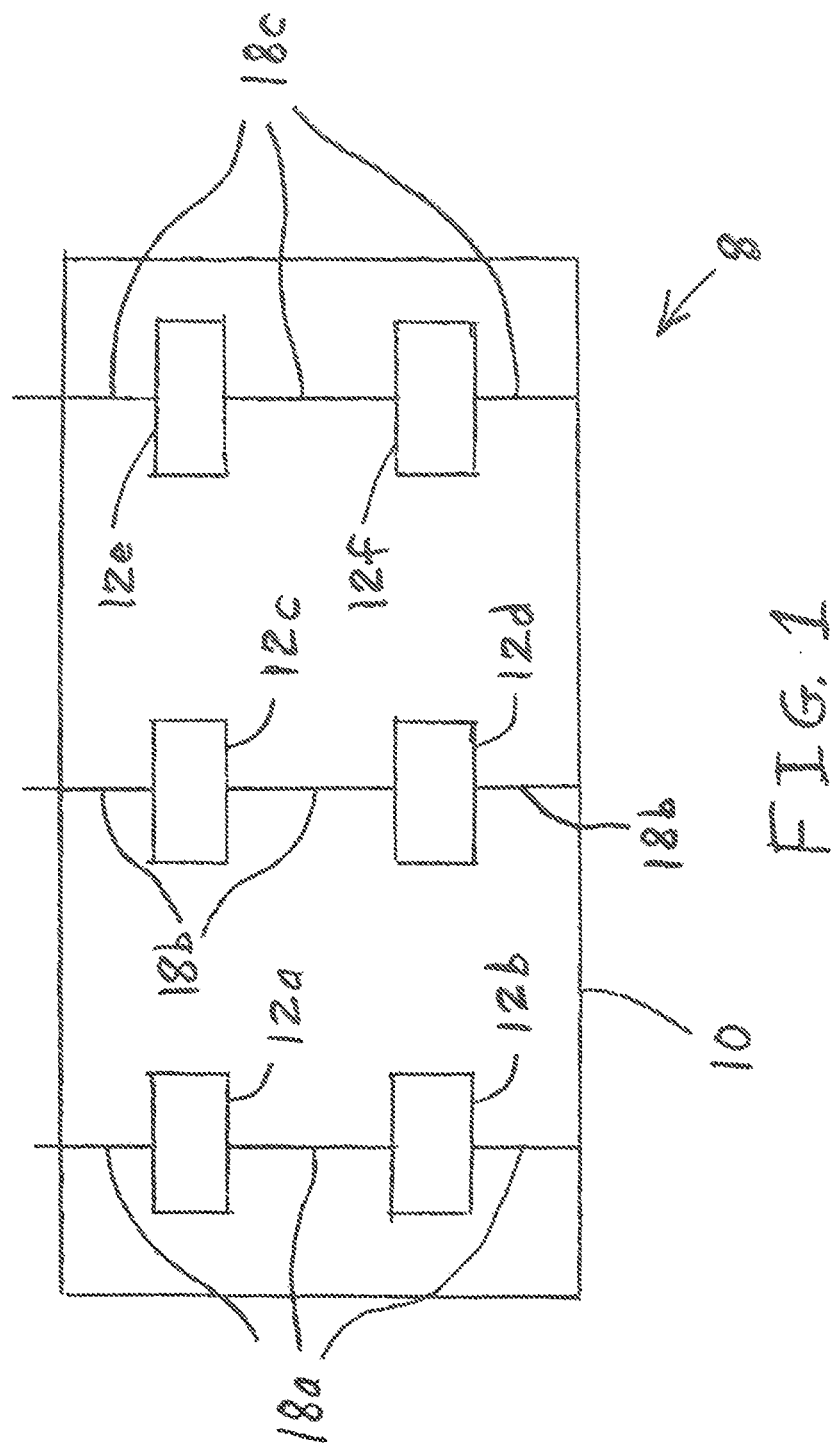
FIG. 1 is a block diagram of one embodiment of an LCD arrangement of the present invention.

FIG. 1 illustrates one embodiment of an LCD arrangement 8 of the present invention, including an LCD 10 and LED backlights 12a-f disposed behind LCD 10. LED backlights 12a-f may be divided into three groups 12a-b, 12c-d and 12e-f which are powered separately through electrically conducting wires 18a-c, respectively.

During use, if the image has "hot spots" (e.g., areas of higher brightness) near the middle of LCD 10, then the duty cycles of middle LEDs 12c-d may be lowered via wire 18b, thus reducing the amount of light being emitted near the middle of LCD 10. Thereby, the displayed image may appear more uniform in brightness throughout.

Figure 2:
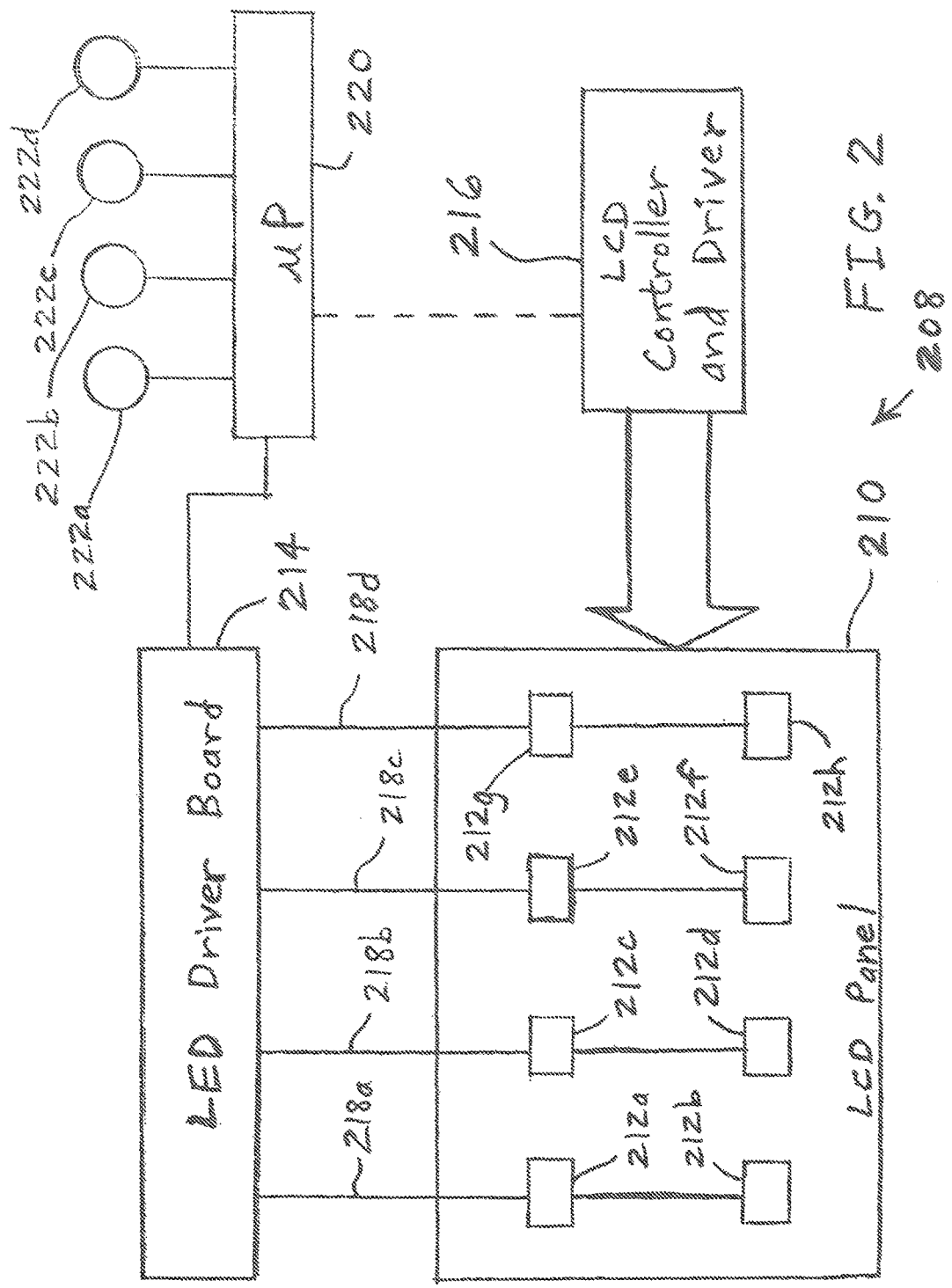
FIG. 2 is a block diagram of another embodiment of an LCD arrangement of the present invention.

FIG. 2 illustrates another embodiment of an LCD arrangement 208 of the present invention, including an LCD Panel 210 and LED backlights 212a-h disposed behind LCD Panel 210. An LED driver board 214 drives LED backlights 212a-h. An LCD controller and driver 216 controls and drives LCD Panel 210. LED backlights 212a-h may be divided into four groups 212a-b, 212c-d, 212e-f and 212g-h which are powered separately through wires 218a-d, respectively.

An electronic controller 220 is communicatively coupled to LED driver board 214 and may or may not be connected to LCD controller and driver 216, as indicated by the dashed line. Rotary dials 222a-d or other manual controls may be connected to controller 220 to enable a user to adjust the current and/or power carried by wires 218a-d, respectively. Thus, dials 222a-d may enable a user to change the light output of each of the groups of LEDs. Dials 222a-d may have other functions (e.g., volume control, radio tuning) when not in a light output adjustment mode. The functions of rotary dials 222a-d may be defined during the design phase, and the adjustments may be saved in controller 220. The users may not need to make any adjustments themselves at all since the uniformity may be optimized, such as in the factory, by the time LCD arrangement 208 is ready for use.

In another embodiment, processor 220 is omitted and dials 222a-d are directly connected to LED driver board 214 with the functionality described above. Thus, LED driver board 214 may serve as an electronic controller for LED backlights 212*a-h*.

Figure 3:
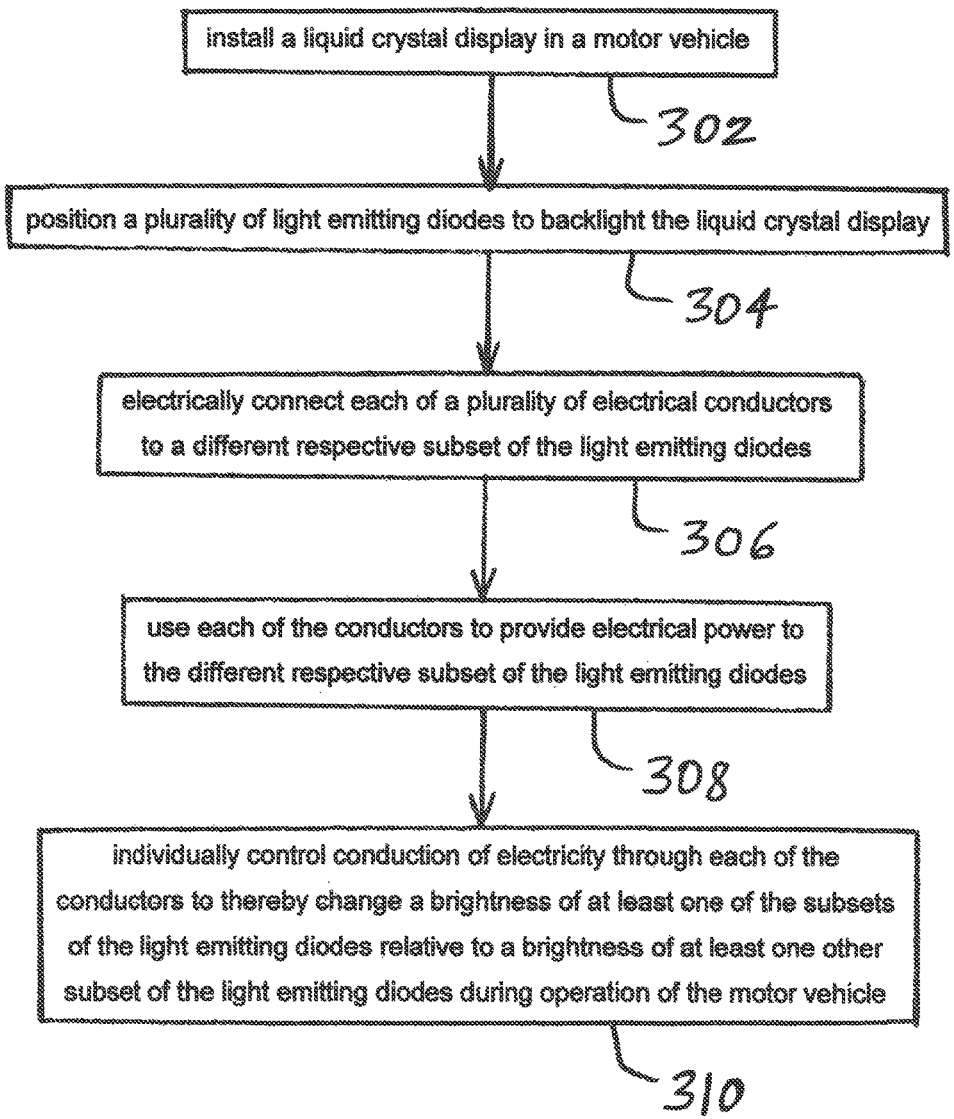
FIG. 3 is a flow chart of one embodiment of a method of the present invention for presenting a display in a motor vehicle.

FIG. 3 is a flow chart of one embodiment of a method 300 of the present invention for presenting a display in a motor vehicle. In a first step 302, a liquid crystal display is installed in the motor vehicle. For example, an LCD Panel 210 may be provided in a motor vehicle.

In a next step 304, a plurality of light emitting diodes are positioned to backlight the liquid crystal display. For example, LED backlights 212*a-h* may be positioned to backlight LCD Panel 210.

Next, in step 306, each of a plurality of electrical conductors is electrically connected to a different respective subset of the light emitting diodes. For example, four groups 212*a-b*, 212*c-d*, 212*e-f* and 212*g-h* of LED backlights may each be electrically connected to an individual one of wires 218*a-d*, respectively.

In step 308, each of the conductors is used to provide electrical power to the different respective subset of the light emitting diodes. For example, each of wires 218*a-d* provides electrical power to a different respective group 212*a-b*, 212*c-d*, 212*e-f*, 212*g-h* of LED backlights.

In a final step 310, conduction of electricity through each of the conductors is individually controlled to thereby change a brightness of at least one of the subsets of the light emitting diodes relative to a brightness of at least one other subset of the light emitting diodes during operation of the motor vehicle. For example, rotary dials 222*a-d* may be connected to controller 220 to enable a user to individually adjust the current and/or power carried by wires 218*a-d*, respectively. Thus, dials 222*a-d* may enable a user to change the light output of each of tire groups 212*a-b*, 212*c-d*, 212*e-f*, 212*g-h* of LED backlights relative to the light output of any other one of groups 212*a-b*, 212*c-d*, 212*e-f*, 212*g-h*.

In the embodiments above, the LEDs are arranged in groups or subsets of two. The LEDs can be grouped in one of any number of ways that makes sense during design. Thus, both LEDs in the same group receive the same duty cycle and output the same level of light. Within each subset of light emitting diodes, the light emitting diodes may be clustered and/or adjacent to each other such that all the light emitting diodes in the same subset illuminate a same area of the LCD.

However, in another embodiment, each single LED is controlled individually through its own respective wire, enabling even more control over the uniformity of the backlighting.

The invention has been described as being applied to LEDs. However, it is to be understood that the invention may also be applied to laser diodes.

The foregoing description may refer to "motor vehicle", "automobile", "automotive", or similar expressions. It is to be understood that these terms are not intended to limit the invention to any particular type of transportation vehicle. Rather, the invention may be applied to any type of transportation vehicle whether traveling by air, water, or ground, such as airplanes, boats, etc. The invention may apply to any application of an LCD.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. A liquid crystal display arrangement for a motor vehicle, the arrangement comprising:
   a liquid crystal display;
   a plurality of light emitting diodes positioned to backlight the liquid crystal display;
   a plurality of electrical conductors, each of the conductors being electrically connected to, and configured to provide electrical power to, a different respective subset of the light emitting diodes;
   an electronic controller electrically coupled to each of the conductors and configured to individually control conduction of electricity through each of the conductors to thereby change a brightness of at least one of the subsets of the light emitting diodes relative to a brightness of at least one other said subset of the light emitting diodes during operation of the motor vehicle; and
   a plurality of user-actuatable controls electrically connected to the electronic controller for individually adjusting the respective brightnesses of the subsets of the light emitting diodes.

2. The arrangement of claim 1 wherein, within each said subset of light emitting diodes, the light emitting diodes are grouped, clustered and/or adjacent to each other such that all the light emitting diodes in a same group illuminate a same area of the liquid crystal display.

3. The arrangement of claim 1 further comprising an LED driver board interconnected between the electrical conductors and the electronic controller.

4. The arrangement of claim 1 wherein the electronic controller comprises an LED driver board.

5. The arrangement of claim 1 further comprising an LCD controller and driver connected to the liquid crystal display.

6. The arrangement of claim 1 wherein the user-actuatable controls comprise dials.

7. A method of presenting a display in a motor vehicle, the method comprising:
   installing a liquid crystal display in the motor vehicle;
   positioning a plurality of light emitting diodes to backlight the liquid crystal display;
   electrically connecting each of a plurality of electrical conductors to a different respective subset of the light emitting diodes;
   using each of the conductors to provide electrical power to the different respective subset of the light emitting diodes;
   individually controlling conduction of electricity through each of the conductors to thereby change a brightness of at least one of the subsets of the light emitting diodes relative to a brightness of at least one other said subset of the light emitting diodes during operation of the motor vehicle;
   electrically connecting a plurality of user-actuatable controls to the electronic controller; and
   enabling a user to individually adjust the respective brightnesses of the subsets of the light emitting diodes by actuating at least one of the controls.

8. The method of claim 7 wherein, within each said subset of light emitting diodes, the light emitting diodes are grouped, clustered and/or adjacent to each other such that all the light emitting diodes in a same group illuminate a same area of the liquid crystal display.

9. The method of claim 7 further comprising interconnecting an LED driver board between the electrical conductors and an electronic controller which performs the individually controlling step.

10. The method of claim 7 wherein the individually controlling step is performed by an LED driver board.

11. The method of claim 7 further comprising connecting an LCD controller to the liquid crystal display.

12. The method of claim 7 wherein the user-actuatable controls comprise dials.

13. A liquid crystal display arrangement for a motor vehicle, the arrangement comprising:
   a liquid crystal display;
   a plurality of light emitting diodes positioned to backlight the liquid crystal display;
   a plurality of electrical conductors, each of the conductors being electrically connected to, and configured to provide electrical power to, a different respective one of the light emitting diodes;
   an electronic controller electrically coupled to each of the conductors and configured to control flow of electrical current through each of the light emitting diodes individually to thereby change a brightness of at least one of the light emitting diodes relative to a brightness of at least one other said light emitting diode during operation of the motor vehicle; and
   a plurality of user-actuatable controls electrically connected to the electronic controller for individually adjusting the respective brightnesses of the light emitting diodes.

14. The arrangement of claim 13 further comprising an LED driver board interconnected between the electrical conductors and the electronic controller.

15. The arrangement of claim 13 wherein the electronic controller comprises an LED driver board.

16. The arrangement of claim 13 further comprising an LCD controller and driver connected to the liquid crystal display.

17. The arrangement of claim 13 wherein the user-actuatable controls comprise dials.

* * * * *